Oct. 1, 1946.   C. D. TRIPP   2,408,457
LOCK NUT MAKING MACHINE
Filed Jan. 7, 1944   7 Sheets-Sheet 1

Inventor
Chester D. Tripp,
By Strauch & Hoffman
Attorneys

Oct. 1, 1946.   C. D. TRIPP   2,408,457
LOCK NUT MAKING MACHINE
Filed Jan. 7, 1944   7 Sheets-Sheet 5

Patented Oct. 1, 1946

2,408,457

UNITED STATES PATENT OFFICE 2,408,457

LOCK NUT MAKING MACHINE

Chester D. Tripp, Chicago, Ill.

Application January 7, 1944, Serial No. 517,409

24 Claims. (Cl. 10—72)

The present invention relates to an improved machine for making lock nuts and more particularly to a machine for converting standard quantity production nuts into lock nuts having a predetermined locking or gripping force.

The need for lock nuts having definitely predetermined locking or gripping forces within close tolerances has been recognized for many years. While satisfactory nuts of special construction have been produced, they are relatively expensive and their use has not been practical except where expense can be disregarded. In spite of repeated attempts, no wholly satisfactory machine for converting standard quantity production nuts into lock nuts having closely controllable predetermined locking or gripping forces was developed until that shown in the present application was devised.

Some of the prior efforts to produce methods and machines for making lock nuts having closely controlled gripping forces from standard quantity production nuts are shown in the patents to Roof 1,209,501; Chadwick 1,391,170; Endsley et al. 1,753,238; Sharp et al. 1,753,250; Sharp 1,795,517; Sharp 1,795,518; and Sharp 2,007,310 and Wilson 2,000,056. While these machines and methods produce grip nuts, variations of 20% or more in uniformity of the gripping force, even when the machines are properly maintained, were customary in a run of standard nuts. In spite of the expenditure of large sums of money by applicant's company, the Grip Nut Company, to improve such machines, they were unable to more closely control the gripping forces because of machine weaknesses and the variations in height and density of the standard nuts.

Another of the prior unsuccessful attempts to provide a machine which would produce uniform indentations, irrespective of the thickness of the nuts, is disclosed in the aforementioned Wilson Patent No. 2,000,056, in which a fluid or spring pressure or impact actuated member carries the indenting tool, but it is open to the objection that it is subject to severe wear, it is difficult to feed the nuts through the machine, and the tool is not shaped to produce a successful lock nut having predetermined locking force. To applicant's knowledge the apparatus of the Wilson patent has not gone into commercial use.

In my co-pending application Serial No. 477,600, filed March 1, 1943, for "Lock nut and method of making same," I have disclosed a method of converting standard nuts into novel effective lock nuts by indenting a face of the nut by means of shallow indentations of rapidly increasing surface area to modify the helix angle of a portion of the threads of the nut adjacent the indentations in proportion to the depth and area of the indentation, and which overcomes all of the disadvantages of the foregoing prior art methods heretofore proposed.

It is the major object of this invention to provide a novel apparatus for carrying out the method of the foregoing co-pending application and to provide other improvements and refinements in lock nut production methods and apparatus, as will hereinafter appear.

Another important object is to provide a machine for making lock nuts embodying means for subjecting the nut to a predetermined indenting pressure which bears a definite relation to the area of the indenting tool, thereby eliminating machine weaknesses and making possible the production of effective lock nuts having substantially more uniform locking characteristics from standard commercial nuts, irrespective of the thickness and density of the nuts.

Another important object is to provide a novel machine for making inexpensive lock nuts having definitely predetermined locking or gripping forces.

A further object resides in the provision of a machine embodying novel means for compensating for the variations in height and density of standard quantity production nuts, so as to assure the production of lock nuts having substantially identical locking or gripping forces.

More specifically, the novel apparatus comprises a die and a die actuating nut backing assembly operable to indent a face of a standard quantity production nut over a rapidly increasing surface area, the die and nut being urged together by a predetermined resilient pressure whereby the uniform resistance of the metal of the nut to displacement of the metal laterally of the applied force balances the resilient pressure and predetermines the depth of indentation, irrespective of nut thickness.

Another object of the present invention resides in the provision of a nut indenting machine designed to indent a face of a standard quantity production unt in such a manner that only the helix angle of the thread is altered to secure the locking effect.

A still further object of the present invention is to provide a machine for pressing a standard quantity production nut between a pair of relatively movable members, one of which is backed by a predetermined resilient force, and designing one of said members to indent a face of the nut axially adjacent the root of the thread and laterally outwardly over a rapidly increasing surface area until the resistance of the metal of the nut to lateral deflection balances the resilient force.

A further object is to provide a die of novel form for indenting the face of a nut adjacent the root of the thread in such manner that only the helix angle of the thread is altered and yet a superior locking action is secured.

Another object is to provide a machine for making lock nuts embodying novel means for feeding the nuts to the die and for removing them from the machine upon conclusion of the die pressing operation.

The invention also aims to provide novel hydraulic and pneumatic controlling mechanisms for insuring proper operation of the machine of the invention, including novel means for establishing and controlling the fluid back up pressure; for making up losses of fluid from the system; and for scavenging fluid leaking past the pistons.

Another object is to provide a novel lock nut machine embodying a vertically reciprocable table on which the nuts are supported and fed toward the die; a novel yielding mechanism for backing up the die and predetermining the ultimate pressure developed between the nut and die, irrespective of the nut thickness; and a novel assembly for feeding nuts into operative position on the table which is synchronized with reciprocations of the table to automatically remove a finished nut and feed a fresh nut into position for every cycle of operation.

A further object is to provide a novel method of and apparatus for removing a nut from the sphere of action of a die pressing or other machine for producing an operation upon the nut.

The apparatus of the present invention contemplates a nut supporting member and an aligned indenting member or die disposed in predetermined spaced relation. One of said members, the pressing member, is designed to have a predetermined constant length of movement toward the other to press a nut therebetween. The die, which may be on either member, is formed with shallow indenting means, the surface area of which increases in a predetermined rapidly increasing ratio to the length, designed to simultaneously deflect the metal surrounding the bolt opening axially and laterally with respect to the direction of movement in all directions away from the opening over a rapidly increasing area. The relative movement of the members is automatically limited by a suitable yielding pressure of predetermined force. Since the length of movement of the pressing member is constant and the resistance of metal having substantially the same physical characteristics to lateral deflection is reasonably uniform, irrespective of the height of the nut, it will be appreciated that the predetermined yielding pressure will be overcome at the instant the opposing pressure, determined by the area of the indenting means multiplied by the pressing force, overcomes the yielding pressure and that further movement of the pressing member causes unitary movement of the pressing member and die. It follows, therefore, that the depth and area of indentation is directly proportional to the yielding force and that substantially identical indentations may be made in successive nuts made up from metals having substantially the same physical characteristics irrespective of the height and minor variations in the density of the nuts.

Figures 6, 8, 9, 10, 11:
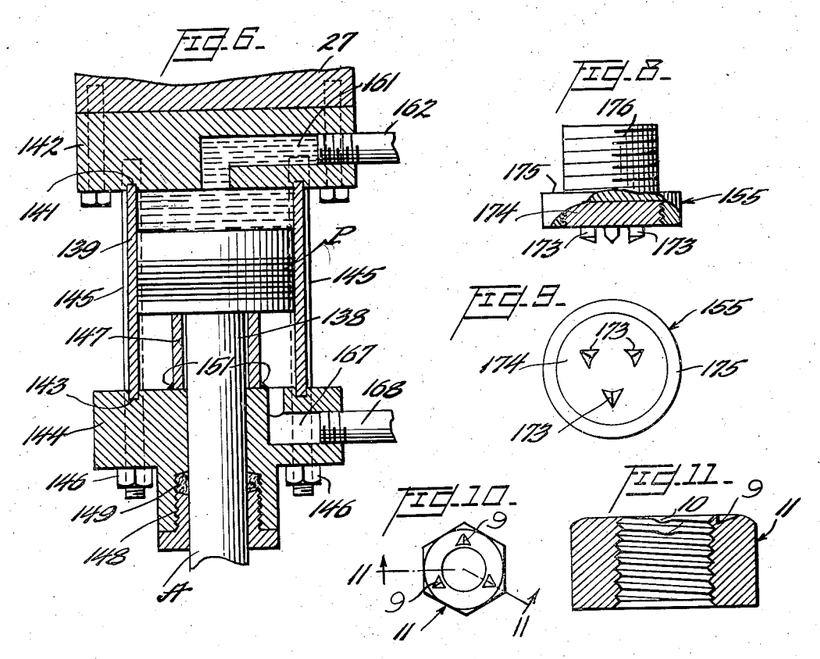
Figure 6 is a detailed sectional view of one of the liquid backed pistons for yieldingly resisting upward movement of the indenting dies used in the machine of Figures 1 to 3.
Figure 8 is a side elevational view of an indenting die made in accordance with the present invention.
Figure 9 is a bottom plan view of the die of Figure 8.
Figure 10 is a top plan view of a nut after it has been indented by the machine of Figures 1 to 3.
Figure 11 is a sectional view of the nut of Figure 10 taken substantially on the line 11—11 of Figure 10 looking in the direction of the arrows.

The apparatus of the present invention contemplates applying the indenting means to a face of the nuts surrounding the threaded opening at spaced points 9 with their points of maximum indentation at a predetermined distance outwardly from the root of the nut thread. While any suitable distance may be used, the present preferred distance is $\frac{1}{32}$ of an inch beyond the root diameter in $\frac{1}{2}$ inch nuts and a similar proportional relationship on nuts of differing sizes. Such application of the indenting means results in an axial distortion only of the helix of the nut thread over a rapidly increasing length of the helix. This forms knobs 10 on the flanks of about two threads of nut 11 as shown in Figure 11 of the drawings. These knobs bind on the flanks of the bolt thread in varying degrees, depending upon the area and height of the knobs, and the size of these knobs is proportional to the area and depth of the indentations. Since the locking effect obtainable results from the degree of binding, it will be clear that the locking force is controllable by varying the yielding backing force and that the yielding force required to obtain a desired locking force on nuts of a particular size can be readily determined by trial and thereafter assured by maintaining the desired yielding force. Furthermore, the knobs or gripping areas of the nut thread may be varied to increase or decrease the frictional resistance between the nut and bolt threads by varying the yielding force or the ratio of the area and height of the indenting means. By employing this novel apparatus, uniformity of the locking force to a variable of less than 15% may be readily obtained in standard production nuts of a given size and material, irrespective of the variations in the height and minor variations in the density of the nuts.

Referring to the drawings.

With continued reference to the drawings, wherein like reference characters are employed throughout to designate the same parts, the nut indenting machine of the present invention is made up of a base B; a supporting super-structure C mounted on base B; a fluid reservoir R mounted on base B; a pressure tank T mounted on super-structure C; a movable platen H; a nut feeding mechanism F; a driving mechanism D and an electric motor M for driving platen H and feeding mechanism F; an anvil or die A operatively associated with movable platen H so as to press a nut between the die and the platen; a piston P, the upper surface of which is subjected to the pressure in tank T through a column of liquid; a liquid pump Q carried by super-structure C and connected to reservoir R and tank T to supply liquid to tank T when desired; a pressure gauge G designed to indicate the pressure in tank T; an air system S leading to tank T and to a valve V and arranged to supply air to a nut discharge mechanism E for discharging indented nuts from platen H.

It will be appreciated, however, that platen H may be replaced by a fixed platen and the pistons P and associated dies A mounted for movement toward the platen, or the dies A alone may be made movable and the fluid backing means applied to the fixed platen without departing from the spirit of the present invention.

Figure 1:
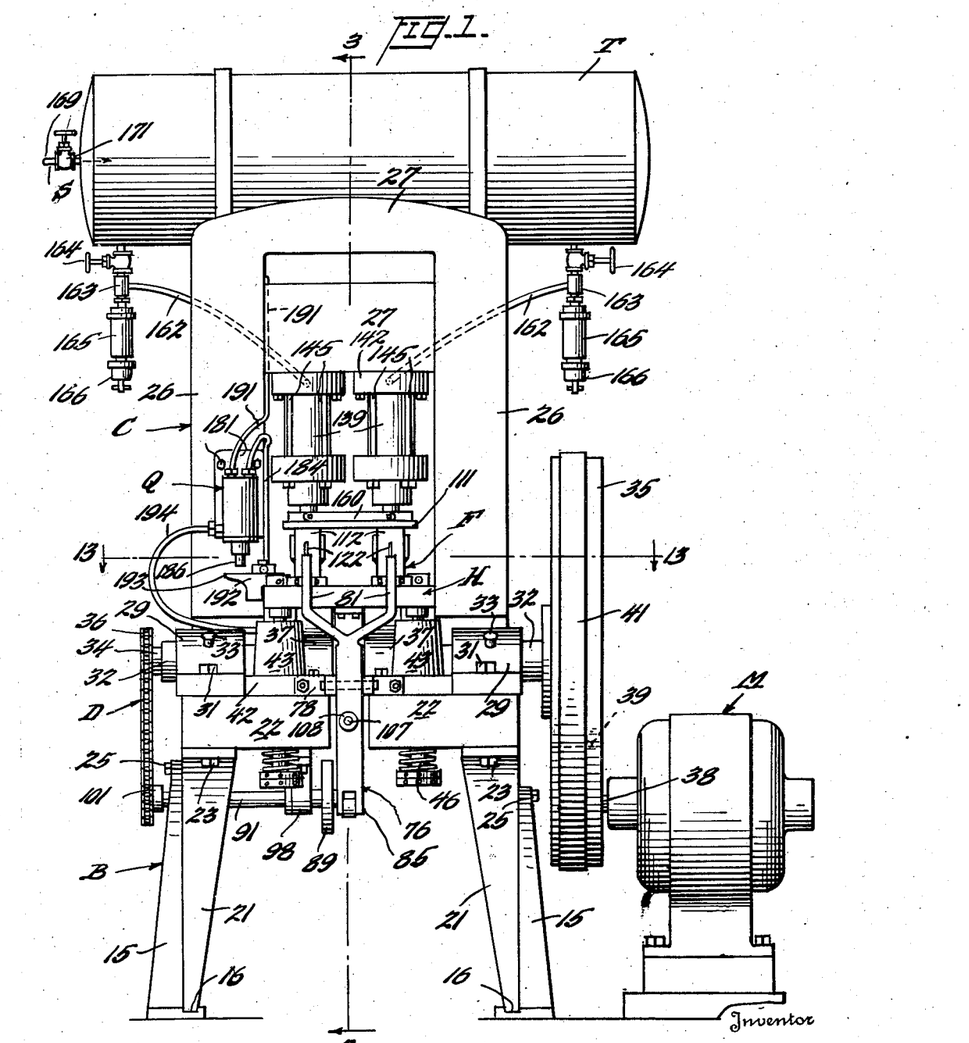
Figure 1 is a front elevational view of a machine made in accordance with the present invention.
Figures 2, 7:
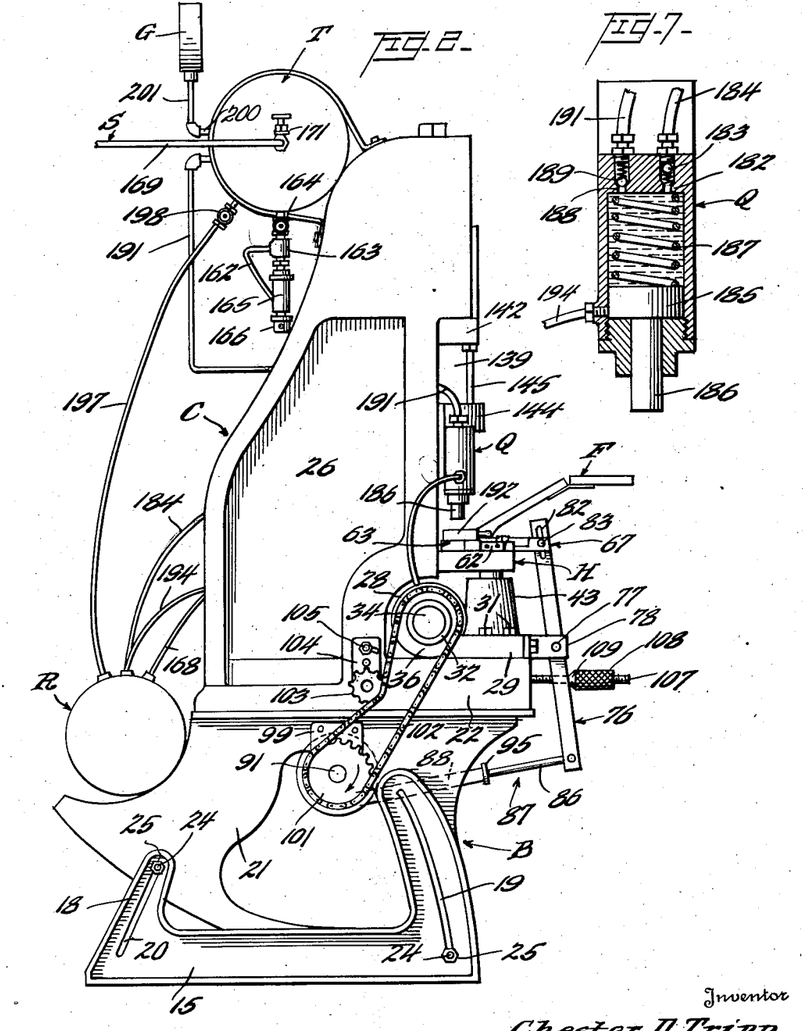
Figure 2 is a side elevational view of Figure 1 viewed from the left hand side thereof.
Figure 7 is a detailed sectional view of the fluid pump used in the machine of Figures 1 to 3 to maintain sufficient liquid in the tank supplying the piston of Figure 6.
Figure 3:
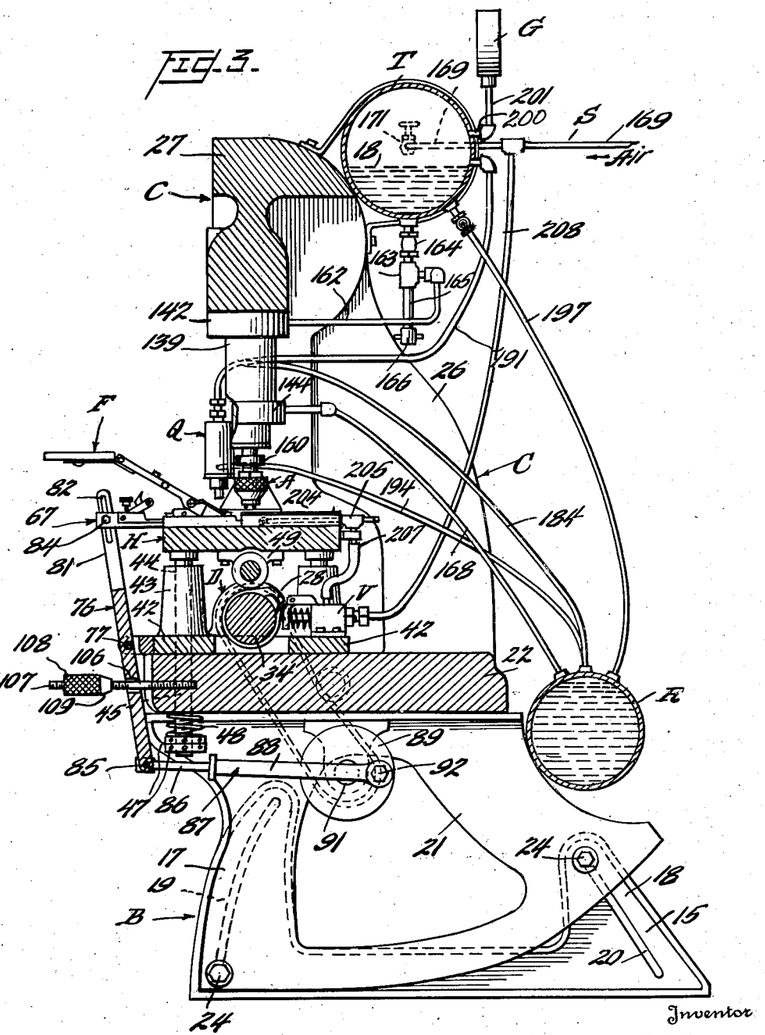
Figure 3 is a vertical sectional view taken on line 3—3 of Figure 1 and looking in the direction of the arrows.

Referring to Figures 1, 2 and 3, base B comprises a pair of spaced supporting legs 15 adapted to rest on the floor and having tracks 16. Each leg 15 is provided with an upwardly extending portion 17 at one end and a second upwardly extending portion 18 at the other end. Each of these portions is respectively provided with slots 19 and 20 (Figures 2 and 3). Disposed in track 16 are spaced rocker members 21 secured to plate 22 by means of bolts 23 (Figure 1). Rocker members 21 also are provided with bolts 24 extending through slots 19 and 20 and receiving nuts 25 to lock the rockers in any desired adjusted position along track 16. It will thus be appreciated that base B provides a structure which may be readily adjusted to level base plate 22, irrespective of the unevenness of the floor upon which the machine is mounted.

Superstructure C comprises end walls 26 integrally formed on plate 22 and interconnected at the top by a bridge member 27. End walls 26 adjacent the front of the machine and plate 22 are recessed as shown at 28 (Figure 2) to receive journal brackets 29 bolted to plate 22 by means of cap screws 31. Journal brackets 29 receive sleeve bearings 32 and are provided with oil cups 33 for lubricating bearings 32 in well known manner. Rotatably mounted in bearings 32 is a main drive shaft 34 having a large pulley wheel 35 secured to one end and a sprocket wheel 36 secured to the other end.

Shaft 34 between journal brackets 29 is provided with spaced cams 37 for a purpose to be hereinafter pointed out. Motor shaft 38 of motor M is provided with a pulley wheel 39 adapted to drive pulley wheel 35 by means of a belt 41 in well known manner.

Plates 42 bolted to plate 22 along the front and rear edges are provided with upstanding columns 43 having vertically extending passages 44 (Figures 3 and 4) adapted to be aligned with similar passages 45 formed in base plate 22. Passages 44 and 45 are adapted to receive pins 46. At their lower ends, pins 46 are threaded to receive a pair of lock nuts 47 (Figure 3) retaining buffer springs 48 between the bottom of base plate 22 and the lock nuts.

While any suitable connection between pins 46 and platen H may be employed, it is preferable to form pins 46 with an integral collar or flange 58 having its upper surface 59 accurately machined to receive the under surface of platen H. The upper ends 61 of pins 46 are threaded to receive the spanner nuts 62 which are screwed down to clamp platen H between nuts 62 and flanges 58. Such a structure will eliminate any tendency of platen H to cock with respect to pins 46.

Figure 4:
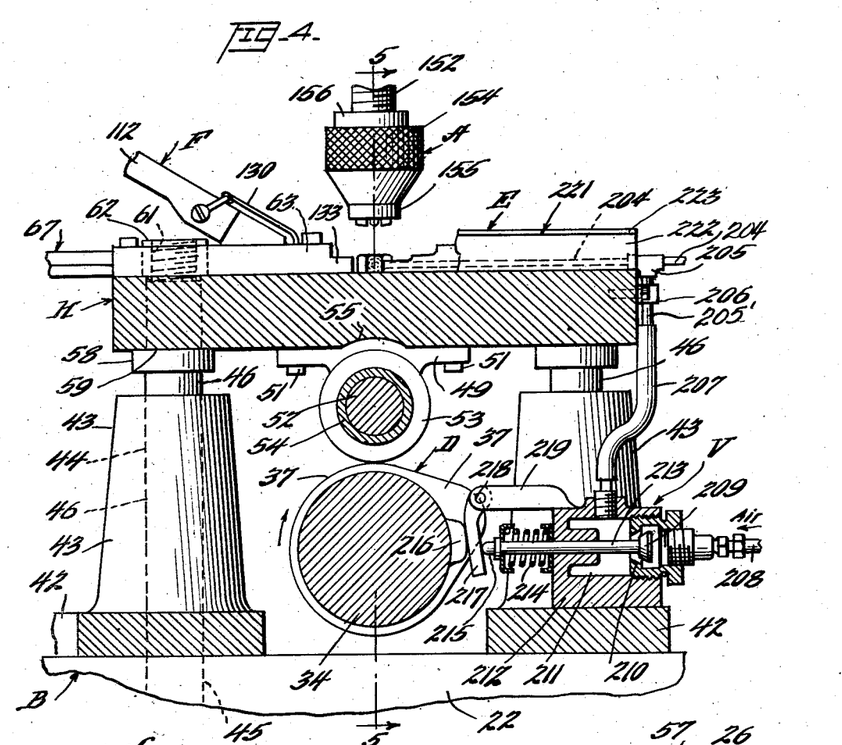
Figure 4 is an enlarged sectional view illustrating the platen reciprocating mechanism and air valve operating means employed in the machine of Figures 1 to 3.
Figure 5:
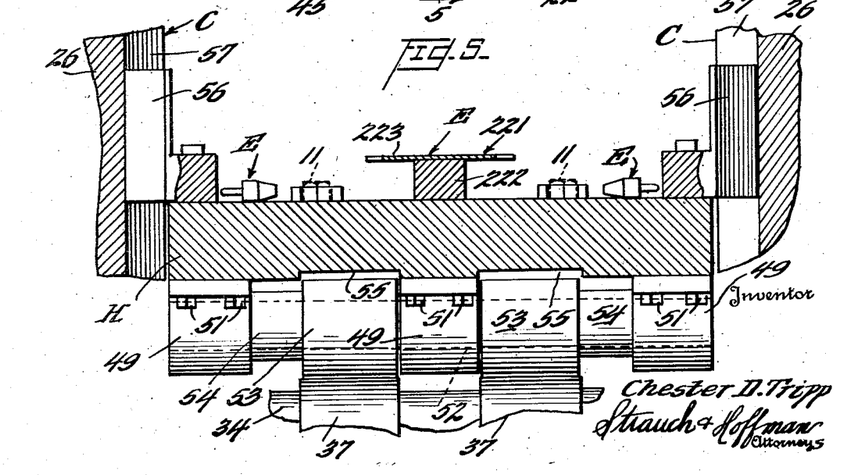
Figure 5 is a detailed sectional view taken on line 5—5 of Figure 4 looking in the direction of the arrows.

Platen H on its lower face and along the transverse center line is provided with journal brackets 49 secured thereto by cap screws 51 (Figures 4 and 5). Journal brackets 49 receive a transversely extending shaft 52 having cam engaging rollers 53 rotatably mounted thereon. Suitable spacing sleeves 54 are disposed between rollers 53 and journal brackets 49 to maintain the rollers in proper axial alignment with respect to cams 37. Platen H is suitably recessed at 55 to clear rollers 53 and has V-guide members 56 bolted to its upper surface (Figures 5, 12 and 13) and sliding in V-ways 57 in walls 26 to guide platen H in its reciprocating movement and prevent cocking of platen H in operation.

From the foregoing description, it will be clear that motor M through pulley 39, belt 41, pulley wheel 35, shaft 34, and cams 37 will impart a smooth vertical reciprocatory movement of constant length to platen H and members 56 and ways 57 will guide the platen in its reciprocating movement. Furthermore, it will be clear that buffer springs 48 will maintain rollers 53 in engagement with cams 37 during all phases of operation of the machine and yieldingly resist upward movement of the platen and dampen any shocks resulting from the cam drive. As a consequence, platen H will be reciprocated in such a manner that undesired shocks will not be transmitted to the superstructure and the base.

Figure 12:
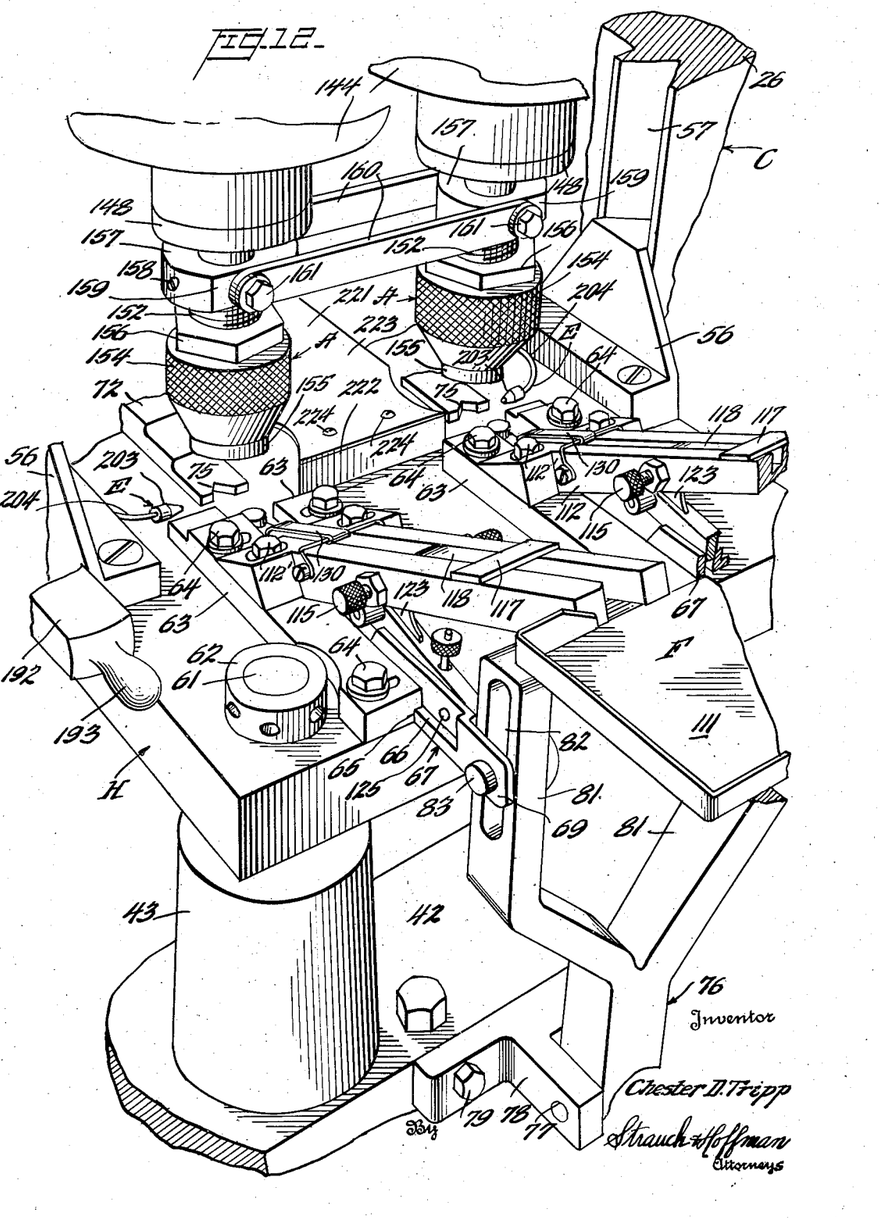
Figure 12 is a fragmental, perspective view of the platen, dies, nut retaining structure and nut feeding mechanism of the machine of Figures 1 to 3.
Figures 13, 14:
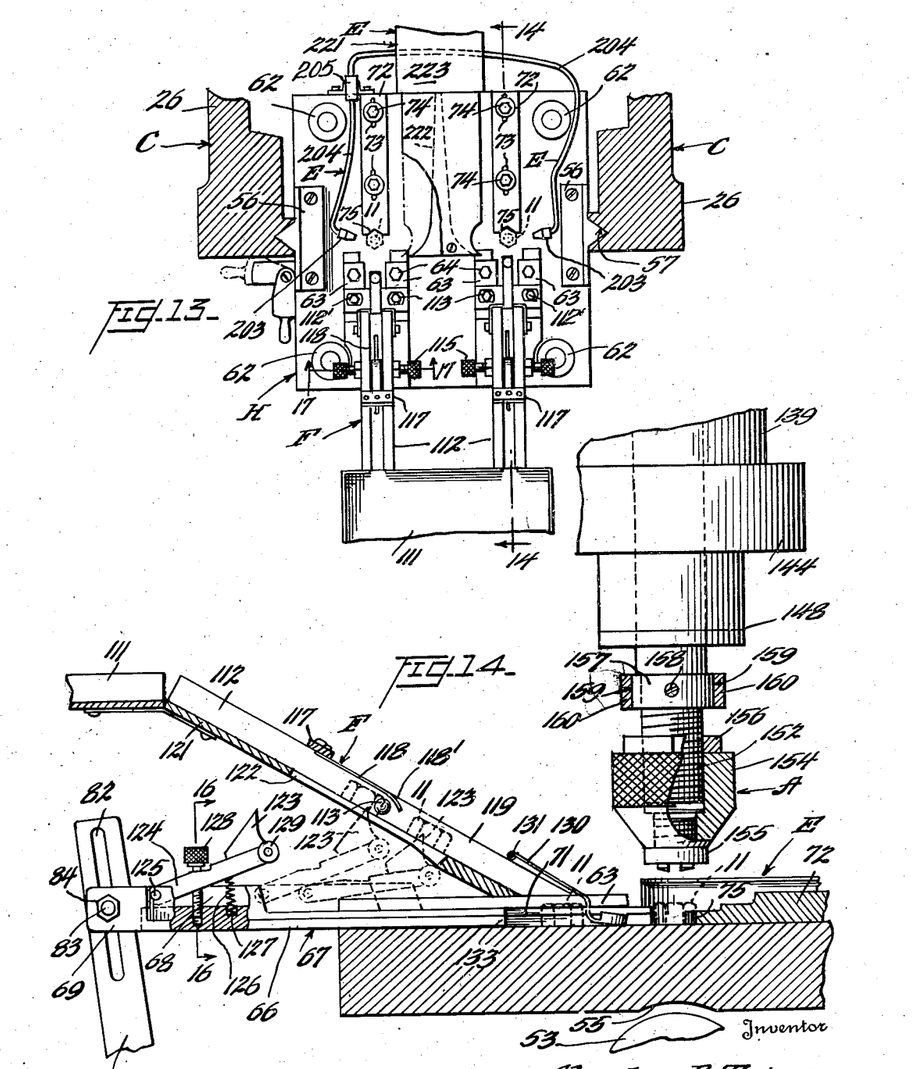
Figure 13 is a horizontal sectional view taken substantially on the line 13—13 of Figure 1 looking in the direction of the arrows.
Figure 14 is a detailed sectional view taken substantially on the line 14—14 of Figure 13 looking in the direction of the arrows.

On its upper face platen H is provided with two pairs of spaced guide rails 63 secured to platen H by bolt and washer assemblies 64 (Figures 12 and 13). Each guide rail 63 is provided with an inverted L-shaped groove 65 adapted to receive the outwardly extending flanges 66 of nut feed bars 67. Feed bars 67 are provided with centrally disposed, longitudinally extending grooves 68 and their outer ends are bifurcated at 69 to connect feed bars 67 to a suitable nut feed driving mechanism to be hereinafter described.

Secured to the upper face of platen H in axial alignment with spaces 71 provided between guide rails 63 are nut positioning members 72 having longitudinally extending bolt receiving slots 73 for longitudinally adjustably mounting members 72 on platen H. Members 72 at their ends adjacent rails 63 are provided with V-shaped notches or pockets 75 for receiving a nut. By reason of the provision of slots 73 members 72 may be adjusted individually longitudinally along the surface of platen H to align each nut receiving pocket 75 with its associated die mechanism A. It will thus be seen that means is provided for adjusting the machine to accommodate various sizes of nuts merely by loosening screws 74, adjusting the position of pockets 75, and utilizing a die mechanism A of appropriate size.

Figure 15:
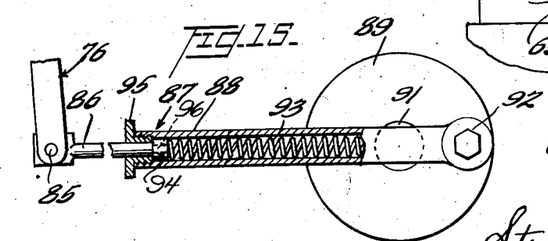
Figure 15 is a detailed sectional view of a telescopic connecting rod employed for operating the nut feeding mechanism of Figures 12-14.
Figure 16:
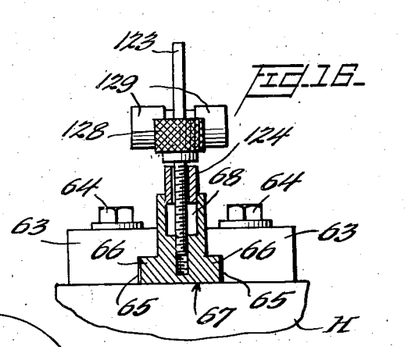
Figure 16 is a detailed sectional view taken substantially on the line 16—16 of Figure 14 looking in the direction of the arrows.

The nut feed driving mechanism of the present invention includes a lever 76 pivoted at 77 on a bracket 78 bolted to front plate 42 by bolts 79 and provided at its upper ends with spaced legs 81 having slots 82 therein (Figures 1, 3, 12 and 14). The slotted portions of legs 81 are disposed within the bifurcated ends 69 of feed bars 67 and maintained in assembled relation by means of threaded pins 83 passing through suitable openings in bifurcated end 69 of feed bar 67 and retained in place by means of nuts 84. The lower end of lever 76 is pivotally connected at 85 to the free end of member 86 of a telescoping connecting rod 87. The free end of the other member 88 of connecting rod 87 is pivotally connected to a crank disk 89 carried at one end of a crank shaft 91 and positioned with respect to axis of shaft 91 and cam 37 so nut 11 will be gripped at the instant die mechanism A contacts the nut. This connection comprises a pivot screw 92 (Figures 1, 3 and 15). Member 88, as clearly seen in Figure 15, is hollow and receives a coil spring 93. One end of spring 93 abuts against an inner end wall (not shown) of member 88 and the other end abuts an enlarged head 94 formed on the telescoping end of member 86. Member 88 at its telescoping end is provided with a threaded cap 95 which is centrally apertured to receive the intermediate portion of member 86. In order to assemble cap 95 and member 86, head 94 is preferably removably associated with member 86 as by screw threads indicated at 96. Crank shaft 91 is journalled in brackets 98 and 99 (Figures 1 to 3) bolted respectively to plate 22 and a member 21 of the supporting base. At its outer end crank-shaft 91 is provided with a sprocket wheel 101 of identical size to the previously described sprocket wheel 36 which is driven from sprocket wheel 36 by means of a sprocket chain 102. Sprocket chain 102 is tensioned by an idler wheel 103 journalled in a bracket 104 pivoted on side wall 26 and adapted to be bolted in predetermined adjusted relation by means of a cap screw 105 threaded into side wall 26. It will thus be seen that shafts 34 and 91 rotate at the same speed.

Lever 76 between its end 77 and 85 is apertured at 106 (Figure 3) to freely receive a threaded stud 107 carried by plate 22. An elongated, knurled, stop nut 108 having a conical abutment end 109 is threaded on stud 107 and provides an adjustable stop designed to limit the pivotal movement of lever 76 in a clockwise direction around pivot 77 and to predetermine the length of stroke of nut feed bar 67 to prevent feed bar 67 from being pressed between platen H and die mechanism A if it should happen that no nut was in passage 71 to be positioned in pocket 75.

Nuts are fed to feed bars 67 from a tray 111 carried by the upper ends of chutes 112 mounted on rails 63 by means of cap screws 112'. Each chute 112 is provided with aligned spherical nut stop members 113 (Figures 14 and 17) which protrude through suitably formed openings in the side walls of chute 112. Stop members 113 are normally held against the peened over portions of the openings by means of coil springs 114, the tension of which may be adjusted by knurled screws 115 adapted to be locked in position by lock nuts 116. As clearly seen in Figure 17, a portion of the spherical stops 113 protrudes into chute 112 to engage the side walls of nut 11 passing down chute 112 to position the nut for engagement by a nut feed pick-up finger to be presently described. It will be clear that adjustment of the tension of springs 114 varies the resistance to downward movement of nuts 11 so that the stop means may be varied to just overcome the weight of nuts above stops 113 to assure the smoothest possible operation of the feed mechanism. The side walls of chute 112 upwardly from stops 113 are bridged by a strap member 117 supporting a spring finger 118 which extends along the space 119 between the side walls of chute 112 and has its end 118' overlying stops 113.

Centrally disposed longitudinally extending slots 122 aligned with the axis of the opening in nut 11 are formed in the bottom walls of chutes 112. These slots are designed to freely receive a narrow pick-up finger 123 carried on the free end of a pivoted arm 124 which is pivotally mounted in slot 68 of feed bar 67 on a pin 125. A coil spring 126 seated in a recess 127 in bar 67 normally biases arm 124 to its upper position with the end finger 123 in horizontal alignment with the opening in nut 11 when the nut is engaged with stops 113 as clearly seen in Figure 14. A suitable stop screw 128 threaded into feed bar 67 limits counter-clockwise rotation of arm 124 around pivot 125 and provides adjustable means for varying the normal position of finger 123. Rollers 129 are provided on the upper end of arm 124 and are designed to engage with the under surface of chute 112 as feed bar 67 moves to the right so as to cam arm 124 downwardly in a clockwise direction and prevent finger 123 from pushing the nut out of chute 112. At its lower end, passages 119 of chutes 112 discharge into spaces 71 between rails 63 and are provided with a weight operated flap valve or member 130 pivoted at 131 so as to normally lie in passage 71 adjacent the lower end of chute 112 and prevent nuts 11 released from finger 123 from gravitationally sliding into the path of the indenting die A.

Figure 17:
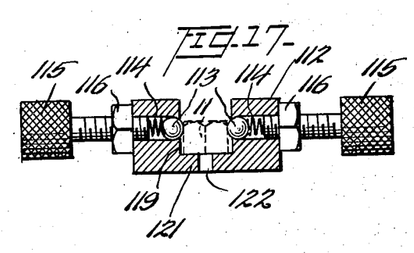
Figure 17 is a detailed sectional view taken substantially on the line 17—17 of Figure 13 looking in the direction of the arrows.

In operation, nuts in tray 111 are fed by hand into the upper end of chute 112, which as seen in Figure 17 is of a width sufficient to just receive the flats of the nuts, and slide down into engagement with stops 113 with one of the corners disposed downwardly of the chute. Assuming that motor M is operating and shaft 34 is rotating in a counter-clockwise direction, crank shaft 91 will be rotated in a counter-clockwise direction causing crank disk 89 to rotate in a counter-clockwise direction and move connecting rod 87 to the left as viewed in Figures 3 and 15. This movement of connecting rod 87 rotates lever 76 in a clockwise direction around pivot 77 until it engages abutment portion 109 of stop nut 108 and moves feed bar 67 to the right as seen in Figures 3 and 14. As feed bar 67 moves to the right, finger 123 is moved into engagement with the opening in nut 11 positioned by stop members 113 and pulls the nut past the stop members and beyond the end 118' of finger 118. During this operation the end 133 of feed bar 67 (Figures 4 and 14) engages the nut 11 located in passage 71 and moves it to the right into nut receiving pocket 75 positioning the nut under die mechanism A and holding it in position under the force of spring 93 during the indenting process. During this movement of nut 11 along passage 71, flap valve 130 is cammed upwardly allowing the nut to pass beyond it into pocket 75 and then drops back upon feed bar 67 which upon retraction permits the flap valve to fall back into place in passage 71. During the retraction of feed bar 67 finger 123 moves the nut 11 engaged by it backward up chute 112 into engagement with end 118' of finger 118 and upon continued retractile movement frees the nut and permits it to slide down chute 112 into position in passage 71. It will thus be seen that nuts are automatically fed one at a time to the receiving and positioning pocket 75 and that inadvertent jamming of nuts in passage 71 is automatically prevented.

Referring particularly to Figures 3, 6, 12 and 14, the drawings illustrate a preferred form of yielding pressure means for limiting the relative movement of platen H and die assemblies A. While any suitable yielding pressure means, such as a pre-loaded spring means or fluid means, may be used, the present invention preferably utilizes fluid backed pistons P carried by piston rods 138 and mounted in cylinders 139. While cylinders 139 may assume any desired form, they are illustrated as open ended cylindrical members, the upper ends of which are seated in recesses 141 formed in cylinder heads 142 bolted to bridge portion 27 of superstructure C (Figure 6). The opposite ends of cylinders 139 are seated in recess 143 formed in cylinder heads 144 mounted on the lower ends of studs 145 carried by heads 142 by means of nuts 146. Spacing sleeves 147 surrounding piston rods 138 limit the downward movement of pistons P toward cylinder head 144. Cylinder heads 144, as clearly seen in Figure 6, are provided with stuffing boxes 148 surrounding rods 138. Suitable packing 149 in stuffing boxes 148 prevents the passage of liquid along rod 138 and serves as a seal. To prevent liquid from leaking around the ends of cylinders 139, any suitable sealing means such as gaskets (not shown) may be interposed between the ends of cylinders 139 and the bottom of recesses 141 and 143. Furthermore, spacing sleeves 147 are preferably welded to cylinder head 144 as shown at 151 to prevent them from rising upon upward movement of pistons P. The lower ends of piston rods 138 are externally threaded at 152 (Figure 12) to receive adaptor members 154 designed to receive indenting dies 155 shown in detail in Figures 8 and 9. Lock nuts 156 threaded on portions 152 of piston rods 138 lock adaptors 154 in adjusted position. As clearly seen in Figure 14, adaptors 154 may be adjusted along threaded sections 152 in order to make fine adjustments of the height of indenting dies 155. To assure proper angular positioning of dies 155, each piston rod 138 is provided with a collar 157 having a set screw 158 designed to lock collar 157 to rod 138. Each collar is provided with diametrically opposed flats 159 adapted to receive one end of a strap member 160. As seen in Figures 1 and 12, the adjacent ends of strap members 160 are connected to one collar by pivot screws 161 and the opposite adjacent ends are similarly connected to the other collar 157. As a consequence, each strap member is freely pivoted at its ends to collars 157 so that independent vertical movement of rods 138 is not impeded. However, angular movement of each rod 138 is opposed by the other when set screws 158 are tightened through straps 160 and collars 157. To adjust the angular position of either rod and its associated die A, it is merely necessary to loosen the associated set screw 158 and turn the rod in its collar 157. This construction, accordingly, serves to permit independent angular adjustment of rods 138 and the associated die A without affecting the height above platen H and also as a lock or key to prevent rotation of rods 138 during operation of the machine. It will thus be seen that very accurate positioning of the dies with respect to the platen H and the nuts in pockets 75 may be accomplished by this adjustment and that manufacturing inaccuracies which might occur and cause deviations between the height of the respective dies above the platen H may be readily compensated.

Referring to Figures 1 to 3 and 6, the manner of supplying liquid to piston P will now be described. As clearly seen in Figure 6, cylinder heads 142 are provided with L-shaped passages 161, one end of which leads into the portion of the cylinder above piston P and the other end of which is connected by means of pipes 162 to outlet connections 163 of tank T. Suitable valves 164 are preferably provided to cut off the flow of liquid from tank T to cylinders 139 when desired. Suitable drain pipes 165 provided with closure caps 166 are also connected to member 163 to drain tank T when desired. Cylinder heads 144 are likewise provided with L-shaped passages 167 connected by means of pipes 168 to the reservoir R.

From the foregoing description, it will be clear that liquid in tank T will flow by gravity into the upper portions of cylinders 139 and that when pressure is exerted on the surface of the liquid in tank T by means of air line 169 of air system S and valves 171, this pressure will be transmitted through the liquid in pipes 162 to pistons P and will retain the pistons in their lowermost position under substantially the same pressure imposed upon the fluid in tank T. Assuming that nuts have been positioned in pockets 75 and that platen H is moved upwardly by cams 37, the nuts will be brought into engagement with dies 155 and relative movement between platen H and dies 155 will continue until the downward force of the associated piston is overcome by the upward force against the particular die 155. When this downward force on either piston is exceeded by the upward force on its associated die 155, piston P will rise off of spacing sleeve 147, such movement being permitted by flow of fluid through pipe 162 into tank T and compression of the air in the upper portion of tank T. Continued upward movement of platen H will cause the platen and die and nut to move as a unit. Since the surface area of the fluid in tank T is substantially greater than the surface area of pipe 162 and piston P, it will be appreciated that a very slight compression of the air in tank T occurs by reason of movement of one or both pistons P. As a consequence, no appreciable difference in the yielding force results and the degree of indentation of each nut will be substantially identical. Accordingly, since the troublesome variations in nut height and density encountered in standard quantity production nuts is relatively small, the movement of pistons P is very slight and any variations in the pressure in tank T caused by the flow of fluid through pipes 162 can be wholly disregarded.

Furthermore, by definitely predetermining the area of the indenting prongs 173 and the height of the effective indenting portions of said prongs, the reacting pressure on piston P through piston rods 138 and the degree of indentation may be accurately predetermined since the upward reacting pressure is determined by the area of contact between the prongs and the metal of the nut multiplied by the force acting against the dies. Since this force is, as a practical matter, constant for each stroke of the cam, the area of engagement between the prongs and nut is the variable factor determining the degree of indentation and is directly related to the yielding pressure.

As a specific example, it has been determined that the indenting prongs of the present invention will be satisfactory if the prongs are made triangular at their ends and the triangular ends are ground fifteen degrees sidewise and fifteen degrees back-off. While not necessary, the inner edges of the prongs are preferably sufficiently sharp to slightly cut the metal of the nut above the root of the thread. Furthermore, the radial distance from the center of the die to the lowermost points of the indenting prongs, which are adjacent the center of the die, should be such that the distance of the innermost line of the indentation in the nut is about $\frac{1}{32}$ of an inch outwardly from the root of the thread in a ½ inch nut. Prongs 173 of the desired form and spacing are preferably carried by a removable auxiliary body section 174 designed to be threaded into main body section 175 threaded at 176 for engagement with adaptors 154. Such sectional dies permit ready interchangeability and are very desirable. Following these general specifications for constructing the dies, extremely satisfactory lock nuts having definitely controllable gripping characteristics have been made by the deflecting machine of this invention and such nuts are meeting with unprecedented approval in the trade. It is to be understood, however, that variations in the shape of the dies and the dimensions given above may be made without avoiding this invention so long as the principle of designing the area and depth of the indenting means so as to balance the yielding pressure by the resistance of the metal of the nut to lateral deflection is employed.

While any means may be provided for replenishing the fluid in tank T, the present invention provides a pump Q bolted to one end wall 26 by cap screws 181 (Figure 1). Pump Q has an inlet port 182 (Figure 7) provided with a one way valve 183 and is connected to the reservoir R by means of a pipe line 184. Pump Q is preferably of the piston type having a piston 185 provided with a downwardly extending actuator rod 186 and a spring 187 normally holding piston 185 in its downward position. An outlet port 188 having a one way valve 189 therein is connected through a pipe line 191 to tank T. The lower end of actuator rod 186 is adapted to be contacted by an actuator member 192, pivoted to platen H, when member 192 is in the position shown in Figure 1, to move the piston upwardly against the resistance of spring 187 to force liquid into tank T. The spring returns the piston in well known manner. Member 192 has a handle 193 to be grasped by the operator to selectively render pump Q inoperative, if sufficient liquid is in tank T, merely by turning member 192 to its inoperative position as shown in Figure 12. A bleed line 194 is connected to pump Q below the piston to drain any liquid, that might by-pass the piston, back into reservoir R. It will thus be seen that a selectively operable pumping system is provided by the present invention to maintain a sufficient quantity of liquid in tank T.

To care for a situation wherein too much liquid may be in tank T, the present invention provides a pipe line 197 containing a cut-off valve 198 leading from tank T to reservoir R. By manipulating valve 198, excess liquid in tank T can be readily drained off into reservoir R. During normal operation of the machine, it will be appreciated that valve 198 is closed to enable the desired pressure to be maintained in tank T. Since valve 189 in pipe line 191 is normally closed and is forced into closed position by pressure in pipe line 191, it will be appreciated that no loss of pressure can occur through this line.

To measure the pressure in tank T, a pipe line 200 leading from tank T is provided with an upwardly extending extension 201 carrying the pressure gauge G.

To automatically eject completed nuts from pockets 75, the present invention provides air nozzles 203 disposed with outlet ends adjacent each pocket 75. Nozzles 203 are connected by pipe lines 204 to a T-shaped union 205. Union 205 is carried by a pipe line 205' secured to the back edge of platen H by a strap 206. Pipe line 205' is connected by a flexible hose 207 to the valve V which is in turn connected through a pipe line 208 to a T-coupling in pipe line 169. While valve V may assume any suitable form, it preferably comprises a poppet valve 209 cooperating with a valve seat 210 which opens into a chamber 211 in a valve body 212 (Figure 4). As clearly seen in this figure, poppet valve 209 has an elongated stem 213 which extends through a wall of body 212 and through a coil spring assembly 214 disposed between said wall and a contact head 215 removably secured to the end of stem 213. Spring assembly 214 is normally loaded to bias poppet valve 209 into sealing engagement with seat 210 to cut off the supply of air from pipe line 169 except when desired at the proper time in the sequence of operation of the machine.

Air is supplied to nozzles 203 at the proper moment by one of the cams 37, one side of which, out of the path of roller 53, is provided with a cam-like member 216 arranged to contact a pivoted valve actuator 217 journalled at 218 on an arm 219 formed integrally with or secured to the valve body 212. Referring to Figure 4, it will be noted that member 216 is adjacent to the highest point of cam 37 so that valve 209 is opened momentarily when platen H is at its lowermost point when the nut is out of contact with the indenting die. This momentary opening of valve 209 directs a blast of air against a flat side of each of the nuts in pockets 75 through nozzles 203 and projects the nuts toward the center of the machine into a discharge chute 221 having a rearwardly tapering, centrally disposed, deflecting member 222 (Figures 12 and 13) and a cover plate 223 bolted thereto by means of screws 224.

Actual experience has shown that a blast of air from nozzle 203 is sufficient to remove the nuts from pocket 75 and project them along the rearwardly directed walls of member 222 and into a suitable receptacle on the floor at the rear of the machine.

While the present machine includes a pair of nut receiving pockets 75 and die mechanisms A along with their individual feed bars 67, guide rails 63, chutes 112 and pressure lines, it will be understood that any number of dies, nut pockets, feed bars and the like may be employed by suitable modifications apparent to those skilled in the art. This invention, accordingly, is not to be limited to the specific machine disclosed but it is intended to be coextensive with the appended claims to which reference should be made to determine its scope.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A machine for making lock nuts of uniform gripping or locking force from nuts of varying height and density formed by standard quantity production methods, comprising a pair of members mounted for relative movement toward each other and operable to press a nut therebetween, one of said members being adapted to support said nuts and the other comprising shallow means of rapidly varying area operable to indent a face of a supported nut and modify the helix angle of a portion of the threads of said nut in proportion to the depth and area of indentation; driving means for imparting a reciprocating movement to one of said members, to bring the members into pressing relationship with the nut; and additional means for applying pressure of predetermined value to one of said members in opposition to said driving means to limit further relative movement of said members and assure indentations of substantially identical depth and area with a substantially identical modification in thread helix angle and a uniform gripping force in nuts of varying height and density.

2. The combination defined in claim 1, wherein said shallow means of rapidly varying area simultaneously deflects the metal of the nut axially of and laterally in all directions away from the nut opening during said pressing operation, the axial and lateral deflections being in definite predetermined ratio and the area of said means being designed to assert a rapidly increasing resistance to penetration of said means up to the point where the resistance balances the pressing force, and to automatically and accurately limit the modification of the helix angle.

3. A mchine for making lock nuts of uniform gripping or locking force from nuts formed by standard quantity production methods, comprising a pair of members mounted for relative movement toward each other to press a nut therebetween; driving means for moving one of said members through a stroke of predetermined length to bring said members into pressing relation, additional pressure operated means connected to one of said members and operable in opposition to said driving means to permit further relative movement of said members until a pressure of predetermined magnitude is built up between said members and the gripped nut, and operable, upon attainment of said pressure of predetermined magnitude, to permit unitary movement of said members and said nut; and shallow indenting means of rapidly increasing surface area carried by one of said members and adapted to axially and laterally indent a face of said nut during such further relative movement of said members, and effect deformation of only the helix angle of the nut thread, said indenting means being so designed that the pressure developed between said members and said nut increases at a greater rate than the degree of axial indentation until said predetermined pressure is attained, whereby said machine is operable to impart identical locking forces to nuts of varying height and density.

4. The machine defined in claim 3, wherein said driving means comprises a rotating shaft having a cam operable to constantly engage said one member, and said one member is provided with means for resiliently maintaining engagement between it and said cam.

5. A machine for forming a lock nut having a modified helix angle comprising a base; a supporting member on said base for supporting a nut receiving plate; a drive shaft journalled on said member; means for guiding said nut receiving plate for vertical reciprocation on said supporting member in a predetermined path; cam means on said drive shaft for reciprocating said nut receiving plate; a hydraulic cylinder supported above said plate; a piston operatively associated with said cylinder; a closed fluid tank, containing a body of liquid exposed to a volume of air, the area of the surface of the liquid being substantially larger than the area of said piston, means connecting said tank to said cylinder, to supply fluid to said cylinder and providing an air cushion for yieldingly opposing flow of liquid from said cylinder; an indenting die carried by said piston and maintained in predetermined spaced relation to said nut receiving plate by the fluid in said cylinder; and means for driving said drive shaft to reciprocate said nut receiving plate toward said die to press a nut supported thereon against said die, whereby a face of said nut is axially indented to only deform the helix angle of the nut thread adjacent the indented area to the extent permitted by the pressure of said fluid.

6. In a machine having relatively movable members operable to successively press nuts therebetween at an indenting station to indent a face of said nuts and modify the helix angle to secure a locking action, a drive shaft having a cam for producing said relative movement of said members, a nut receiving pocket at said indenting station for positioning said nuts; gripping means for holding nuts in said receiving pocket while said nuts are pressed between said members; means for actuating said gripping means, comprising a lever pivoted between its ends and having one end pivotally connected to said gripping means to impart the desired movement thereto; a driven shaft operatively driven by said drive shaft and having a crank positioned thereon in predetermined relation to said cam on said drive shaft to assure proper timed operation of said gripping means; a rod interconnecting said crank and said lever and having relatively endwise movable sections, for actuating said gripping means in response to rotation of said crank; and resilient means acting between said rod sections and operable to automatically compensate for variations in the length of stroke of said gripping means to compensate for variations in size of said nuts and to retain said nuts in said receiving pockets under a yielding engagement pressure while said members press the nut therebetween.

7. The combination defined in claim 6, together with stop means for limiting the range of oscillation of said lever and the stroke of said gripping means, to prevent injury of the parts in the event no nut is in said receiving pocket during actuation of said gripping means.

8. In combination with a nut indenting machine having a reciprocating nut gripping slide, a downwardly sloping nut supply chute, having a bottom wall provided with a longitudinally extending slot, and side walls, for delivering nuts to the gripping end of said slide; spring pressed members mounted in said side walls and protruding into said chute in position to yieldingly arrest downward gravitational movement of nuts along said chute; a pick-up means carried by said slide and operable, upon reciprocation of said slide in one direction, to pass through said slot and engage a nut held by said members and draw it downwardly in said chute past said members; and means operably associated with said chute to prevent the engaged nut from moving upwardly in said chute during the return stroke of said slide and cause said nut to be freed from said pick-up means and delivered by gravity into position to be gripped by the gripping end of said slide during its next reciprocation.

9. Nut feed means for use with a nut indenting machine having a nut receiving pocket; a die for indenting a nut disposed in said pocket; and pressure means for imparting relative movement to said pocket and die to indent said nut; comprising means aligned with said pocket for guiding a nut into said pocket; means for moving a nut along said guide means into said pocket; means for driving said nut moving means in timed relation to said pressure means; a chute for delivering nuts to said nut guiding means; resilient means in said chute to yieldingly arrest gravitational movement of a nut along said chute; nut releasing means carried by said nut moving means for engaging a nut held by said resilient means upon movement of said nut moving means toward said pocket, and operable to propel said nut along said chute past said resilient means; and a second resilient means bridging said chute in the region of said first resilient means for engaging said nut upon reverse movement of said nut moving means to free said nut from said nut releasing means, whereby said nut is freed to slide down said chute into said nut guiding means in position to be moved into said pocket.

10. The combination defined in claim 9, together with pivoted means associated with said nut guiding means to arrest movement of a nut delivered from said chute until the delivered nut is picked up by said nut moving means.

11. The combination defined in claim 9, wherein said nut guiding means and said chute are of a width to position the nut with a corner facing forwardly with respect to said nut feeding means, and said pocket is shaped to receive said corner and is adjustable transversely of the die axis, to assure proper alignment of said nut with the path of movement of said die.

12. The combination defined in claim 9, wherein said nut releasing means is pivoted to said nut moving means and is provided with rollers adapted to engage the underside of said chute and compel said nut engaging means to move longitudinally of said chute to draw said nut past said resilient means.

13. Nut feeding means for a nut indenting machine, comprising a nut receiving chute and a reciprocable bar, an arm pivoted at one end on said bar and having a nut engaging finger at its free end for entering the opening in a nut; resilient means acting upon said arm and constantly tending to swing the free end of said arm away from said bar; stop means on said bar engaging said arm and limiting swinging movement of the arm away from said bar while permitting free movement of the arm toward the bar against the action of said resilient means and means mounting said stop means for adjustment, for predetermining the spacing between said bar and said free end of said arm.

14. A machine for imparting a uniform gripping or locking force to nuts which have been produced by standard quantity production methods, comprising a movable nut indenting die; fluid pressure means resisting movement of said die with a predetermined opposing force; reciprocating means for moving a nut into pressing contact with said die; a reservoir containing fluid for supplying fluid to said fluid pressure means; a reciprocating pump connected to said fluid pressure means and said reservoir for delivering fluid from said reservoir to said fluid pressure means; and means on said nut moving means adapted to be selectively positioned to operate said pump and replenish said fluid pressure means in response to reciprocations of said nut moving means, as required.

15. In a nut indenting machine for converting standard quantity production nuts into lock nuts of predetermined locking force by pressing nuts between a pair of opposed movable members including indenting dies, means for predetermining and controlling the pressing force to which said nuts are subjected, comprising expansible chamber means operably associated with one of said members; a body of liquid acting on said expansible chamber means and connected through a confined column of said liquid to a larger body of said liquid contained in a closed tank, said tank providing a confined body of air above said larger body of liquid; means for delivering compressed air to said tank and maintaining the pressure on said larger body of liquid substantially constant, said expansible chamber means being so disposed that the pressure therein is directly proportioned to the pressure built up between said members and said nut, and embodying relatively longitudinally movable parts; and means for restraining the latter against movement under the influence of said liquid pressure, while permitting free movement thereof in the opposite direction when the pressure between said members and said nut has built up to a predetermined magnitude.

16. The combination defined in claim 15, wherein said first-mentioned member includes a plurality of spaced independently movable indenting dies and said expansible chamber means comprises independent pistons connected to said dies by separate, spaced, parallel piston rods, together with means interconnecting said piston rods to prevent rotation of said piston rods, pistons and dies, while permitting limited independent axial movement thereof.

17. In a nut indenting machine having a base and superstructure for supporting a nut indenting die and a movable platen for supporting a nut and moving it into indenting relation, guide means comprising parallel V-ways in said superstructure parallel to the axis of said indenting dies; and V-guide members carried by said platen and snugly but slidably fitting in said ways to accurately guide said platen in a path parallel to the axis of said die and prevent tilting of said platen.

18. In a machine for converting standard commercial nuts into lock nuts by indenting an end face of the nut to distort the threaded bore thereof, a nut indenting member and a nut supporting member relatively movable toward and from each other, power operated means for reciprocating said nut supporting member to establish an engaged relationship between said indenting member and the nut, said indenting member having a nut penetrating part, and pressure means opposing unitary movement of said members by the power operated means and having a value determined by the desired depth of penetration of the nut by said part, said pressure means being connected with and controlling the entire effective operation of the indenting member independently of said power operated means, whereby uniform penetration of the indenting part and distortion of the nut thread is obtained irrespective of variations in axial thickness and structural density of different nuts.

19. In a machine for converting standard commercial nuts into lock nuts by indenting one end face of the nut to distort the threaded bore thereof; a nut indenting member and a nut supporting member, power operated means to move one of said members toward the other to contact the indenting member with the nut and thereafter tending to impart unitary movement to said members in the same direction, and regulable pressure means coacting with the other of said members to resist such unitary movement and cause a relative movement between said members, to effect a predetermined uniform depth of penetration of nuts of varying axial lengths and density by said indenting member.

20. The combination defined by claim 19 in which the effective action of said pressure means is controlled exclusively by the resistance of the nut to penetration by the indenting member in the relative movement of said members.

21. The combination defined by claim 19 in which said power operated means is operatively connected with the nut supporting member.

22. In a machine for providing standard commercial nuts with self-locking characteristics, a nut indenting member, a nut receiving station having means to position a nut for engagement by said member, a supply chute through which nuts are directed by gravity towards the receiving station, a reciprocable slide for advancing a nut discharged from said chute to the nut receiving station, means for releasably arresting gravity movement of nuts in said chute, and means including a member carried by said slide and operable thereby to directly coact with individual nuts held by said arresting means and release the same for gravity movement from the chute into the path of advancing movement of said slide.

23. The combination defined by claim 22 in which said slide at the end of its advancing movement cooperates with the nut positioning means at the receiving station to grip and hold the nut during the indenting operation, and wherein means is provided for controlling the effective operation of the indenting member and the nut feeding and gripping slide in timed relation to each other.

24. The combination defined by claim 22, in which said slide operated member, in the advancing movement of the slide, engages and moves the nut in one direction in the chute against the resistance of said arresting means, together with a relatively fixed stop engaging the nut in its movement in the opposite direction with said member as the slide is retracted, to release said nut for gravity discharge from the chute.

CHESTER D. TRIPP.